United States Patent
Snyder et al.

(10) Patent No.: US 10,960,460 B2
(45) Date of Patent: Mar. 30, 2021

(54) ADDITIVE MANUFACTURED MOLD, A METHOD OF MANUFACTURING THE MOLD, AND A WORKPIECE CASTED FROM THE MOLD

(71) Applicant: United Technologies Corporation, Farmington, CT (US)

(72) Inventors: Brooks E. Snyder, Dartmouth (CA); Thomas N. Slavens, Moodus, CT (US); Mark F. Zelesky, Bolton, CT (US); James T. Auxier, Bloomfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 51 days.

(21) Appl. No.: 15/112,009

(22) PCT Filed: Jan. 23, 2015

(86) PCT No.: PCT/US2015/012729
§ 371 (c)(1),
(2) Date: Jul. 15, 2016

(87) PCT Pub. No.: WO2015/112885
PCT Pub. Date: Jul. 30, 2015

(65) Prior Publication Data
US 2016/0346831 A1    Dec. 1, 2016

Related U.S. Application Data

(60) Provisional application No. 61/930,514, filed on Jan. 23, 2014.

(51) Int. Cl.
*B22C 9/04*     (2006.01)
*B33Y 80/00*    (2015.01)
(Continued)

(52) U.S. Cl.
CPC .............. *B22C 9/04* (2013.01); *B22C 1/00* (2013.01); *B22C 7/02* (2013.01); *B22C 9/10* (2013.01);
(Continued)

(58) Field of Classification Search
CPC .. B22C 9/04; B22C 9/10; B22C 9/108; B22C 1/00; B22C 7/02; B22C 21/14
See application file for complete search history.

(56) References Cited

U.S. PATENT DOCUMENTS

| 4,434,835 A | 3/1984 | Willgoose |
| 5,465,780 A * | 11/1995 | Muntner ................ B22C 9/04 164/369 |

(Continued)

FOREIGN PATENT DOCUMENTS

| EP | 2359959 A1 | 8/2011 | |
| EP | 2937161 A1 * | 10/2015 | ............ C04B 35/14 |

OTHER PUBLICATIONS

EP search report for EP15740212.4 dated Dec. 21, 2016.

*Primary Examiner* — Kevin P Kerns
*Assistant Examiner* — Steven S Ha
(74) *Attorney, Agent, or Firm* — Getz Balich LLC

(57) ABSTRACT

A mold for manufacturing a casted workpiece is, at least in-part, manufactured utilizing an additive manufacturing process. The mold may have a core having non-line-of-sight features that are additively manufactured and in contact with an outer shell of a wax mold and/or an outer shell of a casting mold of the mold. The outer shell of either the wax or casting molds may also be additively manufactured, and the shell of the casting mold may be additively manufactured as one unitary piece to the core.

7 Claims, 6 Drawing Sheets

(51) Int. Cl.
*B22C 7/02* (2006.01)
*B22C 9/10* (2006.01)
*B22F 5/00* (2006.01)
*B22F 3/105* (2006.01)
*B22F 7/06* (2006.01)
*B22C 21/14* (2006.01)
*B33Y 10/00* (2015.01)
*B22C 1/00* (2006.01)
B29L 31/00 (2006.01)
B29C 64/153 (2017.01)

(52) U.S. Cl.
CPC .............. *B22C 9/108* (2013.01); *B22C 21/14* (2013.01); *B22F 3/1055* (2013.01); *B22F 5/007* (2013.01); *B22F 7/062* (2013.01); *B33Y 10/00* (2014.12); *B33Y 80/00* (2014.12); B29C 64/153 (2017.08); B29L 2031/757 (2013.01); Y02P 10/25 (2015.11)

(56) References Cited

U.S. PATENT DOCUMENTS

| | | | |
|---|---|---|---|
| 6,412,541 | B2 | 7/2002 | Roesler et al. |
| 2003/0062145 | A1 | 4/2003 | Frasier et al. |
| 2006/0065383 | A1 | 3/2006 | Ortiz et al. |
| 2007/0221359 | A1* | 9/2007 | Reilly ............... B22C 9/103 164/516 |
| 2010/0006252 | A1* | 1/2010 | Roby .................. B22C 7/02 164/15 |
| 2012/0291983 | A1* | 11/2012 | Graham ............... B22C 9/04 164/516 |
| 2013/0025810 | A1* | 1/2013 | Castle ............... B29C 67/0051 164/15 |
| 2013/0220570 | A1 | 8/2013 | Sears et al. |
| 2013/0266816 | A1 | 10/2013 | Xu |
| 2014/0217647 | A1 | 8/2014 | Pallari |

* cited by examiner

ADDITIVE MANUFACTURED MOLD, A METHOD OF MANUFACTURING THE MOLD, AND A WORKPIECE CASTED FROM THE MOLD

This application claims priority to PCT Patent Application No. PCT/US15/012729 filed Jan. 23, 2015 which claims priority to U.S. patent application Ser. No. 61/930,514 filed Jan. 23, 2014, which are hereby incorporated herein by reference in their entireties.

BACKGROUND

The present disclosure relates to additive manufacturing, and more particularly, to a mold, an additive manufacturing method for producing the mold and a workpiece casted from the mold.

Traditional casting of workpieces involves the formation of a mold often created through a die casting and/or an investment casting process. Die casting typically involves forcing a molten material such as metal under pressure into a mold cavity. The mold cavity may be defined by two dies that are typically machined into the required shape forming a "negative" of the workpiece or a cavity that resembles the form of the workpiece. Often, and to achieve the finished workpiece, further machining to the cast part is still required.

Investment casting involves, first, the formation of a wax model or pattern that resembles the workpiece. This formation typically requires time consuming and expensive fabrication of a mold or die defining a cavity that resembles the "negative" of the wax model. The wax material is poured into the mold in a molten state, left to harden, and the mold removed to reveal the wax model. Often, multiple wax patterns are used together to form a complete and complex model of the workpiece. The twill "wax" may include any known sacrificial material capable of being evacuated, possibly through melting or vaporization, from the final mold. After attaching the various wax patterns to form the wax model, typically through the use of a heated tool, the model is further chased and dressed to form the completed and refined model.

Next, a mold typically made of ceramic and known as the investment, is produced from the sacrificial wax model. This is typically done by dipping the model into a slurry of fine refractory material for a smooth surface of the workpiece, then stuccoed with a course ceramic material. Multiple steps of dipping, stuccoing and drying may be involved before achieving the final mold. The final mold is then de-waxed through melting and/or vaporization of the wax material. Many additional steps are often applied to address a host of concerns and workpiece requirements including stress concerns within the mold and excessive porosity of the mold, amongst others.

A need exists to reduce the expense and time in manufacturing casting molds along with the development of new processes resulting in a more robust and finished mold.

SUMMARY

A method of manufacturing a mold according to one, non-limiting, embodiment of the present disclosure includes the step of additively manufacturing at least in-part the mold.

Additionally to the foregoing embodiment, a core of the mold is, at least in-part, additively manufactured.

In the alternative or additionally thereto, in the foregoing embodiment, the core has a non-line-of-sight feature that is additively manufactured.

In the alternative or additionally thereto, in the foregoing embodiment, the method has the steps of forming an outer shell of a wax mold, and inserting the core into the outer shell.

In the alternative or additionally thereto, in the foregoing embodiment, the outer shell is die casted through at least in-part machining.

In the alternative or additionally thereto, in the foregoing embodiment, the method has the steps of filling a cavity defined by the core and the outer shell with a wax material, solidifying the wax material in the cavity, and removing the outer shell to reveal a wax model of a workpiece.

In the alternative or additionally thereto, in the foregoing embodiment the method has the step of forming an outer shell of the casting mold about the wax model using an investment casting process.

In the alternative or additionally thereto, in the foregoing embodiment the method has the step of evacuating the wax material after forming the outer shell.

In the alternative or additionally thereto, in the foregoing embodiment, the core has a non-line-of-sight feature.

In the alternative or additionally thereto, in the foregoing embodiment the method has the steps of additively manufacturing a shell of the casting mold, and inserting the core into the shell.

In the alternative or additionally thereto, in the foregoing embodiment, a core and an outer shell are additively manufactured as one unitary piece and a non-line-of-sight feature of the core connects the core to the outer shell.

In the alternative or additionally thereto, in the foregoing embodiment the method has the steps of additively manufacturing an outer shell of a wax mold, and inserting the core into the outer shell.

In the alternative or additionally thereto, in the foregoing embodiment, at least the non-line-of-sight features of the core and an outer shell of a wax mold are additively manufactured as one unitary piece with the non-line-of-sight feature being connected to the outer shell.

A casting mold according to another, non-limiting, embodiment has an additive manufactured core.

Additionally to the foregoing embodiment, the mold includes an additive manufactured outer shell, and a cavity defined between the outer shell and the core.

In the alternative or additionally thereto, in the foregoing embodiment, the mold includes a non-line-of-sight feature of the core being in contact with the outer shell.

In the alternative or additionally thereto, in the foregoing embodiment, the core and the outer shell are additively manufactured as one unitary piece.

In the alternative or additionally thereto, in the foregoing embodiment, the core is made of a ceramic material.

In the alternative or additionally thereto, in the foregoing embodiment, the core is made of a refractory metal.

A casted workpiece according to another, non-limiting, embodiment includes a body having a directional grain microstructure, and wherein the body has a non-line-of-sight hole, and at least a part of a mold, having a non-line-of-site feature associated with the non-line-of-sight hole and for manufacturing the workpiece, is manufactured through an additive manufacturing process.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
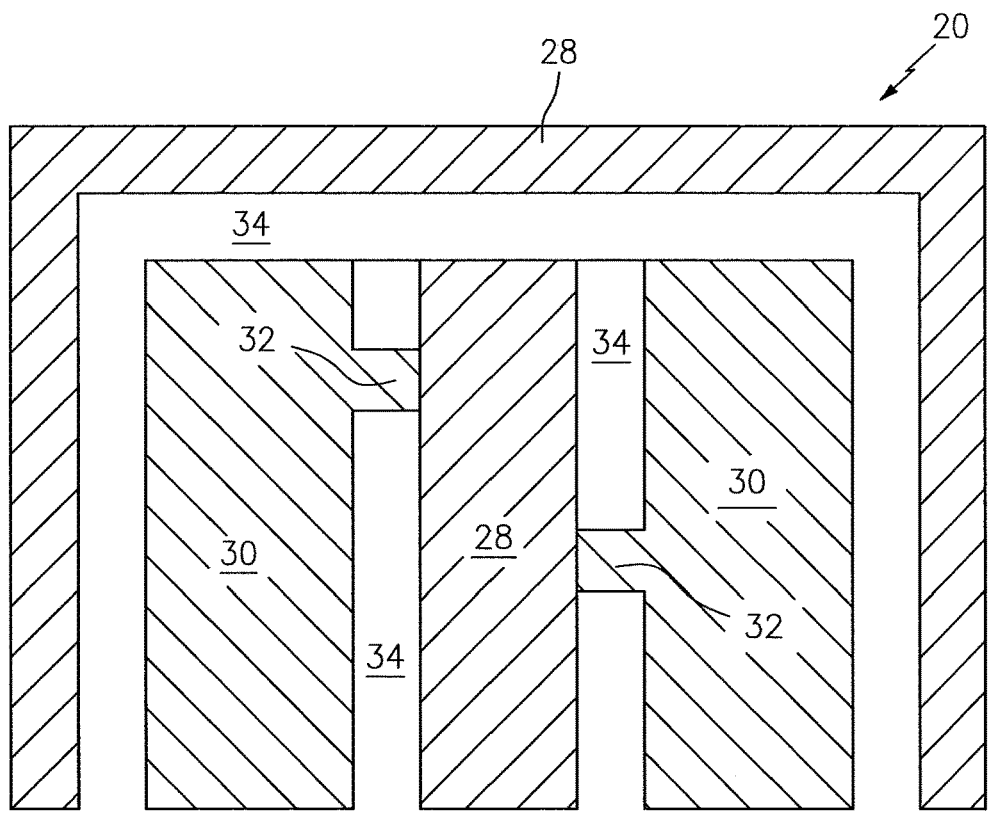
FIG. 1 is a cross section of a wax mold according to one non-limiting embodiment of the present disclosure.
Figure 2:
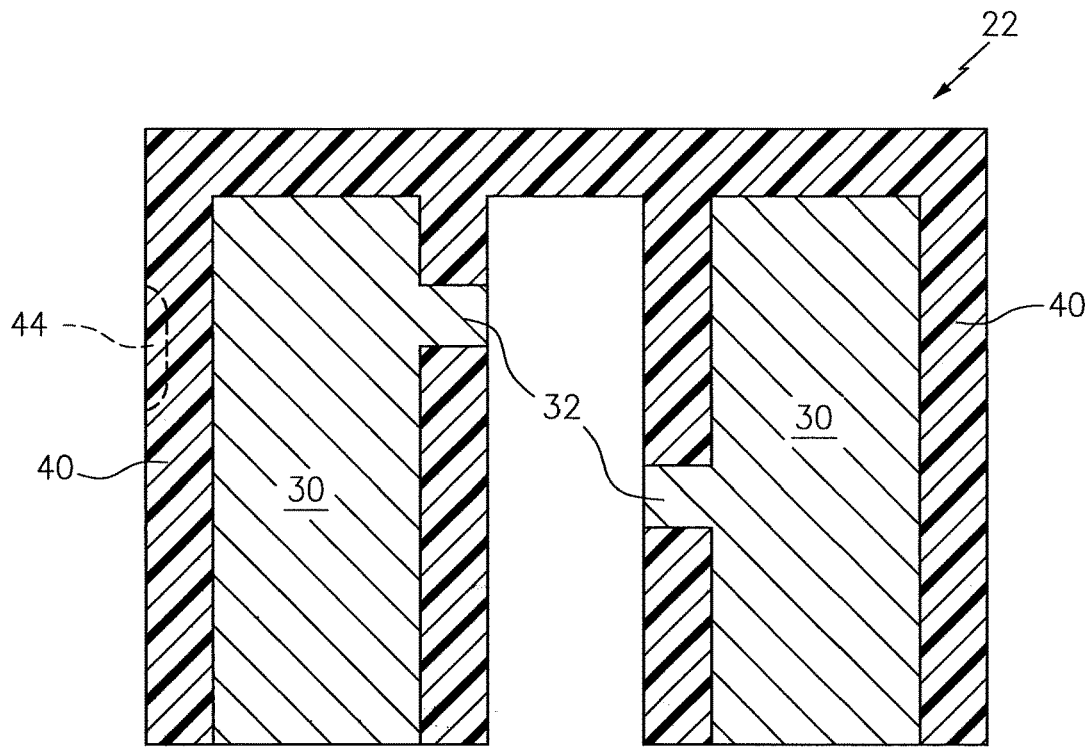
FIG. 2 is a cross section of a wax model created from the wax mold.
Figure 3:
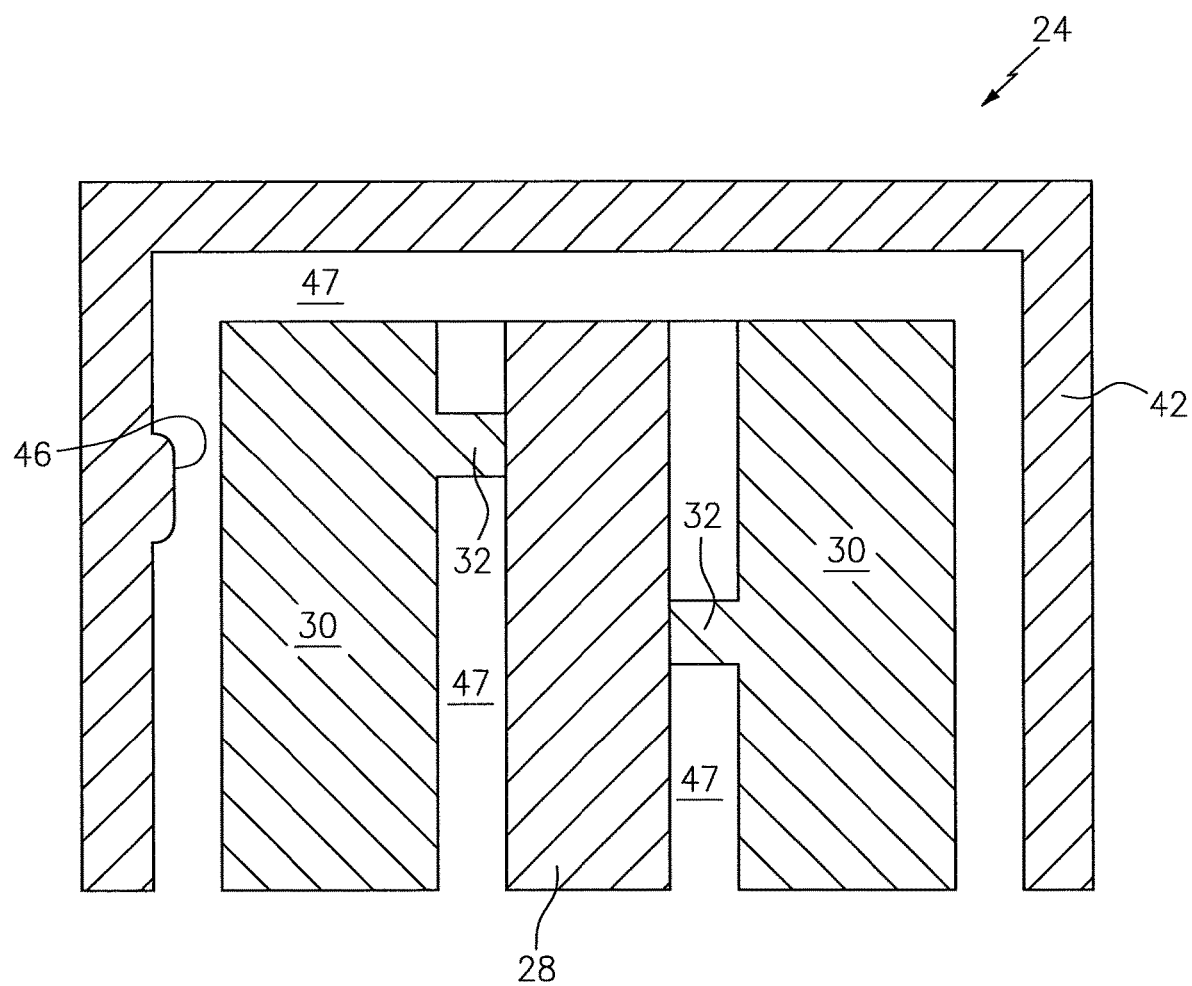
FIG. 3 is a cross section of a casting mold formed generally from the wax model.
Figure 4:
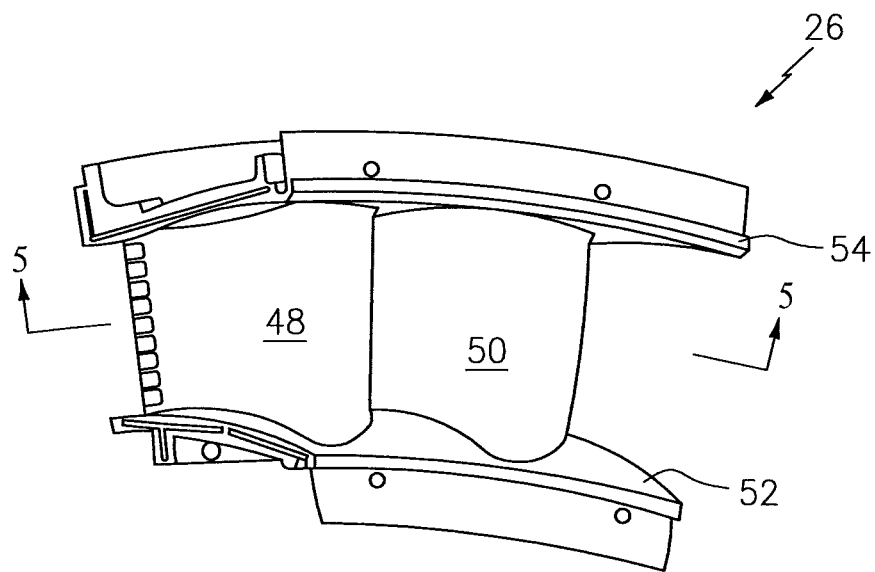
FIG. 4 is a perspective view of a workpiece made by the casting mold.
Figure 5:
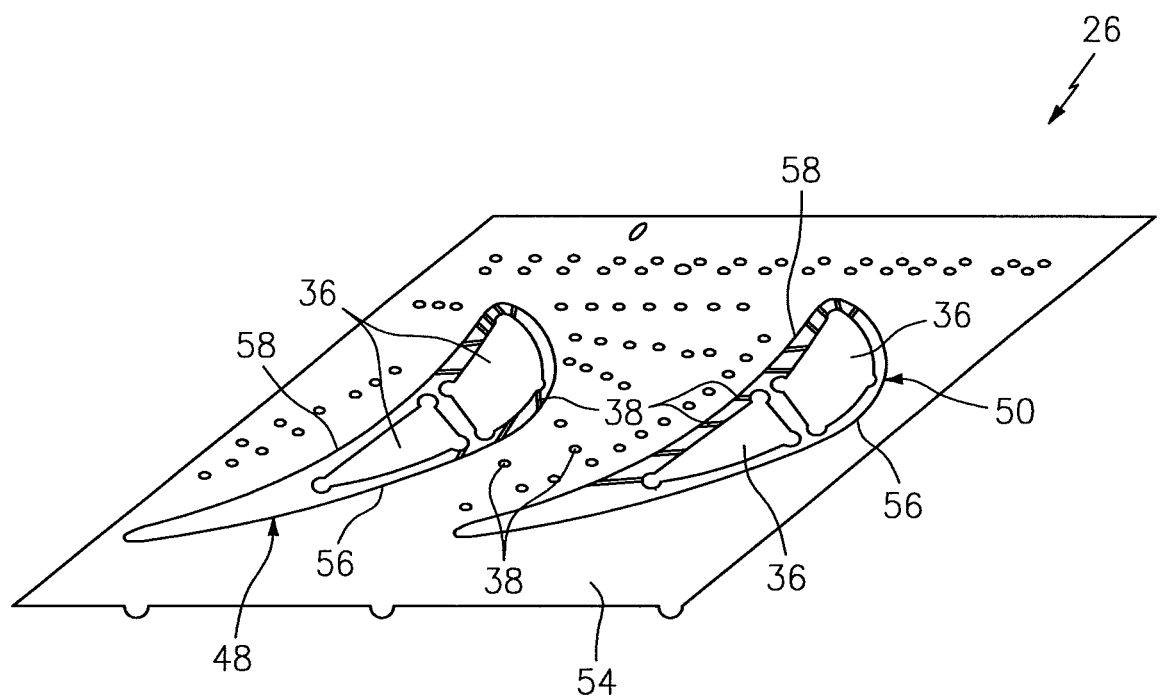
FIG. 5 is a cross section of the workpiece taken along line 5-5 of FIG. 4.

FIG. 1 illustrates a wax mold 20 used to form a wax model 22 (see FIG. 2), that in turn is used to generally form a casting mold 24 (see FIG. 3) for the manufacture of a workpiece 26 (see FIGS. 4 & 5). The wax mold 20, the wax model 22 and the casting mold 24 may generally be part of an investment casting process. The wax mold 20 has an outer shell 28 and may have at least one inner core 30. The inner core 30 may have a non-line-of-sight feature 32 that contacts the shell 28 when the wax mold 22 is assembled. A cavity 34 is defined between the shell 28 and the core 30 that generally represents (except for refinements) a profile of the workpiece 26 and the inner core 30 represents a "negative" of internal voids and/or passages 36 in the workpiece 26 (see FIGS. 4 & 5). Similarly, the one or more non-line-of-sight features 32 of the core 30 represent a "negative" of passages or holes 38 in the workpiece 26 that are not otherwise easily machined, lasered or placed into the workpiece after a more traditional casting process is completed. For clarity and when the singular "mold" is used, this may include both the wax mold 20, the casting mold 24 or portions thereof. It is further contemplated and understood that the non-line-of-sight feature 32 may be integrable to the final design of the cast workpiece 26 and may provide structural and geometric stability during the casting process.

The wax model 22 may be formed by pouring a wax material 40 (in molten or liquid form) into the cavity 34 of the wax mold 22. The wax material 40 is then allowed to harden and the shell 28 is removed. Any known method of shell removal may be employed and is dependent upon the physical configuration of the shell. The shell 28 may be a type of die cast that is mechanically removed in multiple pieces for re-use, or the shell may be dissolved through a base or acid bath depending on the material composition of the shell. The core 30 remains as part of the wax model 22 after removal of the shell. The shell 28 is made of a material capable of withstanding the wax material 40 in a molten state, able to provide the wax model 22 with a desired surface finish, and capable of being removed without removing the core 30. One, non-limiting, example of such a material may be a castform polystyrene modeled by a three-dimensional computer system. The core 30 may be made of a ceramic, a refractory metal, or a combination of both. The term "wax" when used by those skilled in the art, may not be an actual wax material but is any material that can be melted, vaporized, or otherwise removed after forming the casting mold 24.

Prior to forming a shell 42 of the casting mold 24, the wax model 22 may be further shaped or joined to other wax models (not shown). Shaping may include introduction of refinements 44 upon or into the wax material 40, and that may be created through the use of heated tools and wax welding techniques. After refinement of the wax model 22, the shell 42 may then be formed over the model such that the shell 42 includes a "negative" refinement or refinement profile 46 of the model that is not found on the shell 28 of the wax mold 22. Like the core 30, the shell 42 may be made of a refractory metal, ceramic, or a combination of both; or, any other material capable of withstanding the material of the workpiece 26 when in a molten state, and able to provide the desired surface finish of the workpiece. Similar to the wax mold 20, a cavity 47 that represents a shape of the workpiece 26 is defined between the shell 42 and the core 30.

Referring to FIGS. 4 and 5, one example of a workpiece 26 is a vane cluster of a gas turbine engine. The vane cluster 26 has at least two airfoils 48, 50 spaced from one-another and both spanning between inner and outer platforms 52, 54. Both airfoils 48, 50 may have internal cooling passages as the voids 36 of the workpiece that are generally defined between and by vacuum and pressure walls 56, 58 of each respective airfoil. The outer platform 54 may have non-line-of-sight cooling holes 38 for forming a film cooling blanket across the platform. The holes 38 may be positioned such that any access to machine the holes into the outer platfoini 54 is generally blocked by the inner platform 52 and vice-versa. Similarly, non-line-of-sight holes 38 may communicate through the vacuum wall 56 of the first airfoil 48 and are positioned such that the second airfoil 50 generally blocks or prevents conventional machining of the holes through the vacuum wall 56. Moreover, the pressure wall 58 of the second airfoil 50 may have non-line-of-sight holes 38 that generally cannot be machined due to the proximity of the first airfoil 48. A material composition of a body of the vane cluster 26 may be made of a superalloy such as a nickel-based alloy having a directional grain microstructure such as single crystal and known to those skilled in the art. The required formation of such grain structure may limit fabrication of the vane cluster 26 (as one, non-limiting, example) to casting techniques as oppose to direct-build additive manufacturing processes. It is further contemplated and understood that the vane cluster 26 may be a full annulus cast vane ring as another, non-limiting, example of the workpiece.

Where the desired fabrication of workpieces, or portions thereof, is through casting processes as opposed to additive manufacturing processes (e.g. needed formation of grain structure), fabrication of casting molds may still be fabricated utilizing additive manufacturing. For more complex casting molds often having internal cavities, examples of additive manufacturing systems may include, Additive Layer Manufacturing (ALM) devices, such as Direct Metal Laser Sintering (DMLS), Selective Laser Melting (SLM), Laser Beam Melting (LBM) and Electron Beam Melting (EBM) that provide for the fabrication of complex metal, alloy, polymer, ceramic and composite structures by the freeform construction of the work product, layer-by-layer. The principle behind additive manufacturing processes involves the selective melting of atomized precursor powder beds by a directed energy source, producing the lithographic build-up of the work product. The melting of the powder occurs in a small localized region of the energy beam, producing small volumes of melting, called melt pools, followed by rapid solidification, allowing for very precise control of the solidification process in the layer-by-layer fabrication of the work product. These devices are directed by three-dimensional geometry solid models developed in Computer Aided Design (CAD) software systems.

Figure 6:
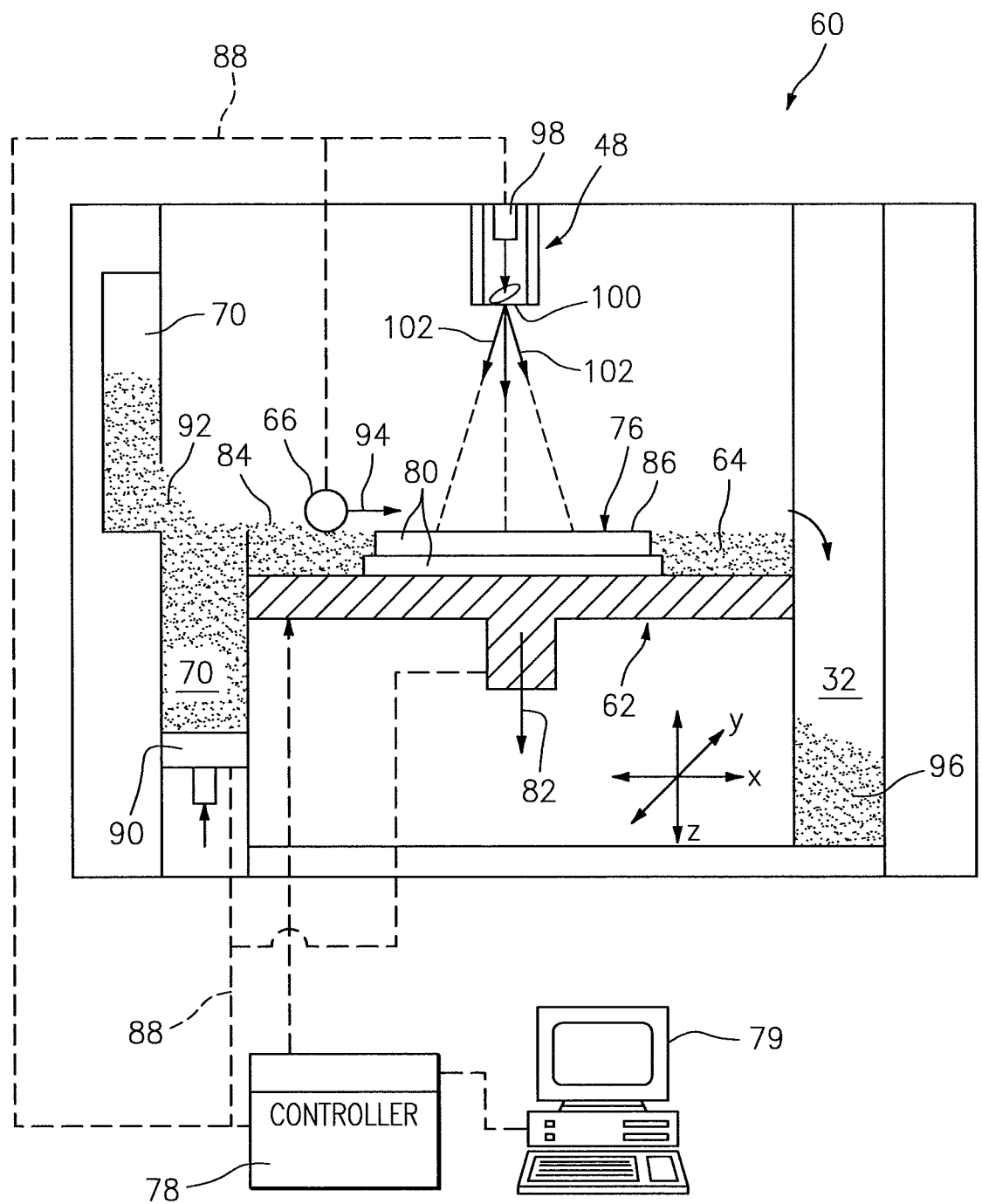
FIG. 6 is a schematic of an additive manufacturing system used in the method of manufacturing the wax mold and the casting mold according to the non-limiting embodiment of the present disclosure.

One example of an additive manufacturing system 60 capable of manufacturing the wax and casting molds 20, 24 is schematically illustrated in FIG. 6. The additive manufacturing system 60 has a build table 62 for holding a powder bed 64, a particle spreader or wiper 66 for spreading the powder bed 64 over the build table, an energy gun 68 for selectively melting regions of a layer of the powder bed, a powder supply hopper 70 for supplying powder to the spreader 66, a powder surplus hopper 72 and an ultrasonic inspection system 74. The additive manufacturing system 60 may be constructed to build the wax mold 20, the casting mold 24 or any portions thereof, in a layer-by-layer fashion. The powder bed 64 is composed of the same material composition as the molds being additively manufactured.

A controller 78 of the additive manufacturing system 60 may include a computer 79 for entering data and that contains software for programming automated functions in accordance with inputted three dimensional computer aided design models of either or both molds 20, 24. The models may include a breakdown of the molds 20, 24 into a plurality of slices 80 additively built atop one-another generally in a vertical or z-coordinate direction (see arrow 82). Each solidified slice 80 corresponds to a layer 84 of the powder bed 64 prior to solidification and each layer 84 is placed on top of a build surface 86 of the previously solidified slice 80. The controller 78 generally operates the entire system through a series of electrical and/or digital signals 88 sent to the system 60 components. For instance, the controller 78 may send a signal 88 to a mechanical piston 90 of the supply hopper 70 to push a supply powder 92 upward for receipt by the spreader 66. The spreader 66 may be a wiper, roller or other device that pushes (see arrow 94) or otherwise places the supply powder 92 over the build surface 86 of the molds 20, 24 (or any portion thereof) by a pre-determined thickness established through downward movement (see arrow 82) of the build table 62 controlled by the controller 78. Any excess powder 96 may be pushed into the surplus hopper 72 by the spreader 66.

Once a substantially level powder layer 84 is established over the build surface 86, the controller 78 may send a signal 88 to the energy gun 68 that energizes a laser or electron beam device 98 and controls a directional mechanism 100 of the gun 68. The directional mechanism 100 may include a focusing lens that focuses a beam (see arrows 102) emitted from device 98 which, in-turn, may be deflected by an electromagnetic scanner or rotating mirror of the mechanism 100 so that the energy beam 102 selectively and controllably impinges upon selected regions of the top layer 84 of the powder bed 64. The beam 102 moves along the layer 84 melting region-by-regions of the layer 84 at a controlled rate and power, melting each region into pools that then solidify and ultimately form the slice 80. The process then repeats itself where another powder layer 84 is spread over the last solidified slice 80 and the energy gun 68 melts at least a portion of that layer along with a meltback region of the previously solidified slice 80 to form a uniform and homogeneous mold or portion thereof.

Figure 7:
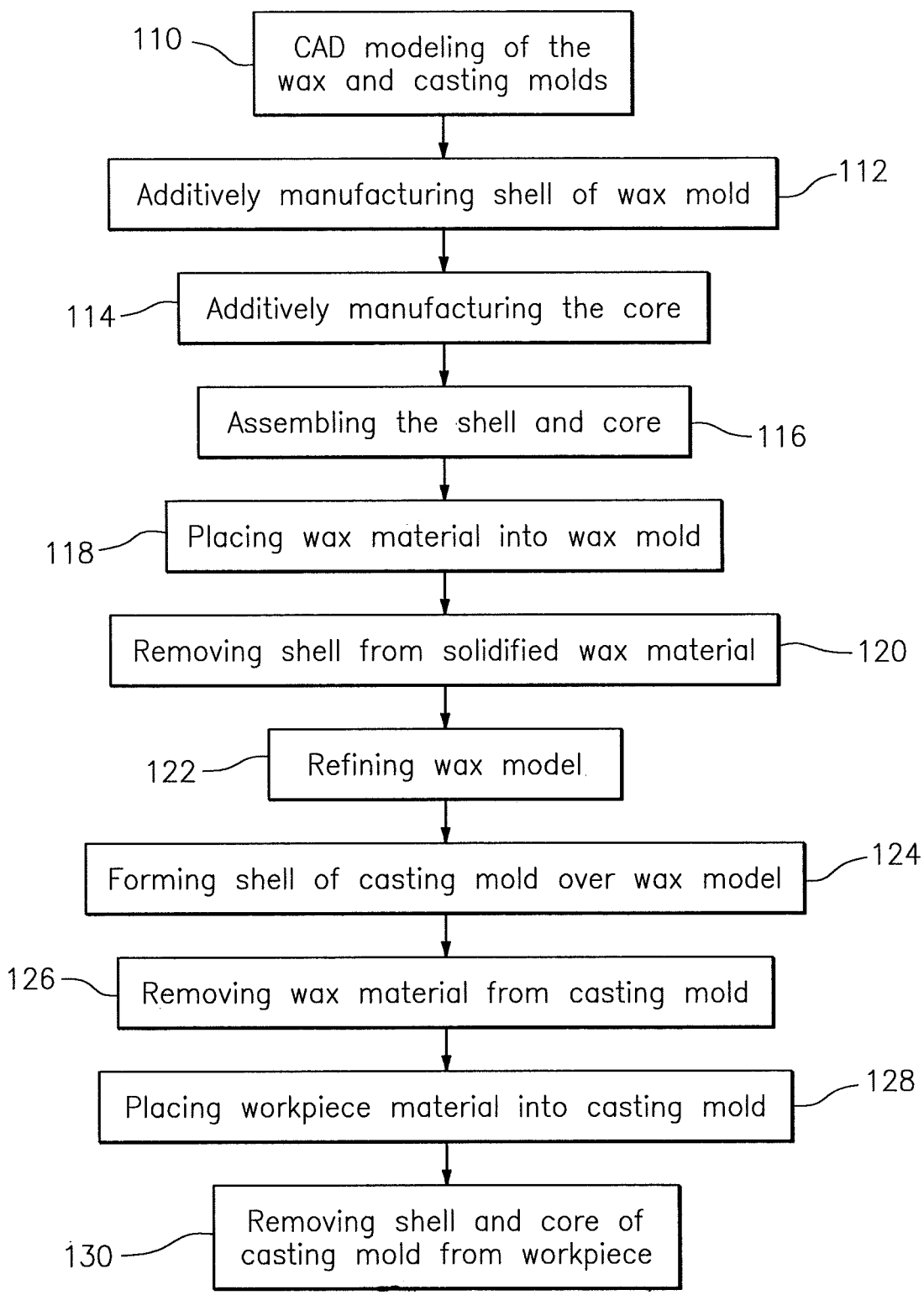
FIG. 7 is a flow chart of a method of manufacturing the wax mold and the casting mold.

Referring to FIG. 7 and manufacturing the casting mold 24 utilizing the additive manufacturing system 60, an initial step 110 may be developing a three dimensional computer aided design (CAD) model of the shell 28 of the wax mold 20, the core 30, and the shell 48 of the casting mold 24. This model is then inputted into the controller 78 of the system 60. As step 112, the shell 28 is additively manufacture utilizing the system 60 (as one example) and associated process. As step 114, the core 30 may be manufactured utilizing the system 60 and associated process. It is further contemplated and understood that a plurality of core portions may be individually manufactured with any one or all being additively manufactured. Moreover, only the non-line-of-sight features 32 may be additively manufactured onto a remaining portion of the core 30 that may be cast using more traditional casting and/or machining processes.

As step 116, the shell 28 and the core 30 are assembled utilizing at least in-part the non-line-of-sight features 32 to properly position the core 30 within the shell 28. As step 118, the wax material 40, in a molten or liquid state, may be poured into the cavity 34 of the wax mold 20 and allowed to solidify. As step 120, the shell 28 is mechanically removed or dissolved utilizing an appropriate solvent while maintaining the core 30 in the wax material 40. As step 122, the solidified wax model 22 is then inspected and further refined by, for example, tooling the refinement 44 into the wax material 40.

As step 124, the shell 42 of the casting mold 24 may be formed over the refined wax model 22 with the core 30 utilizing conventional investment casting methods. As step 126, the wax material 40 is melted or vaporized out of the casting mold 24. As step 128, a material of the workpiece 26 is poured into the cavity 47 of the casting mold 24 in a molten state and allowed to solidify. It is further contemplated and understood that the solidification of step 128 may be in accordance with traditional methods known to form directional grain microstructures or single crystal compositions of, for example, superalloys or nickel-based alloys. As step 130, the shell 42 and the core 30 are mechanically removed and/or dissolved utilizing an appropriate solvent leaving behind the workpiece 26 that may have non-line-of-sight holes 38. It is further contemplated and understood that the refined wax model 22 may be imaged and modeled utilizing a three dimensional computer aided design system. Once modeled, the shell 42 may be manufactured utilizing the additive manufacturing system 60 and associated processes.

Figure 8:
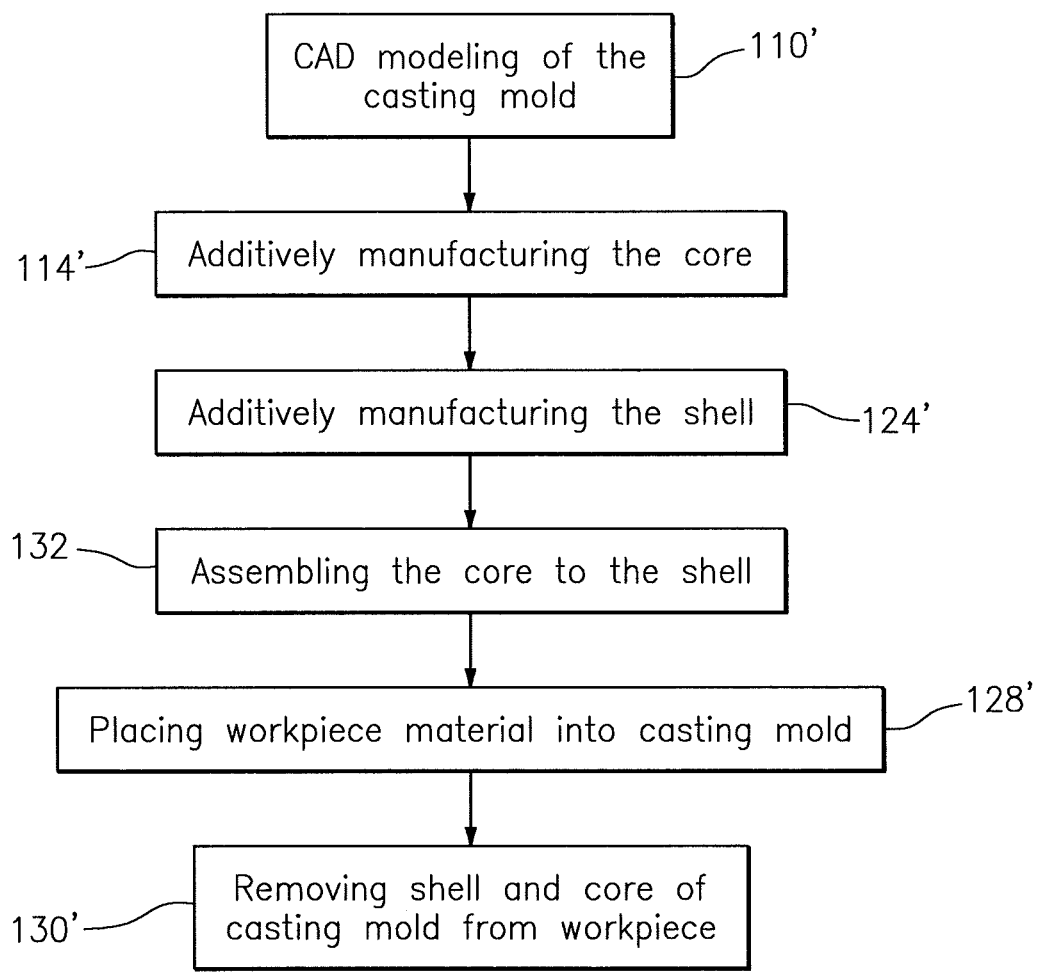
FIG. 8 is a flow chart of a second, non-limiting, embodiment of a method of manufacturing the casting mold.

Referring to FIG. 8, a second, non-limiting, embodiment of a method of manufacturing the casting mold 24 is illustrated wherein like method steps have like identifying numerals except with the addition of a prime symbol. In the second embodiment, an initial step 110' may be developing a three dimensional computer aided design (CAD) model of the core 30, and the shell 48 of the casting mold 24. This model is then inputted into the controller 78 of the system 60. As step 114', the core 30 may be manufactured utilizing the system 60 and associated process. As step 124', the shell 42 of the casting mold 24 may be additively manufactured without the use of a wax model. As step 132, the shell and the mold are assembled and may utilize non-line-of-sight features 32 of the core 30 to properly position the core into the shell. As step 128', a material of the workpiece 26 is poured into the cavity 47 of the casting mold 24 in a molten state and allowed to solidify. As step 130', the shell 42 and the core 30 are mechanically removed and/or dissolved utilizing an appropriate solvent leaving behind the workpiece 26 that may have non-line-of-sight holes 38. It is further contemplated and understood that the shell 42 and the core 30 may be additively manufactured as one unitary piece thereby eliminating the assembly step 132. Moreover, the casting mold may not require a core at all and is thus limited to the shell.

It is further contemplated and understood that a portion of the core 30 may be cast with one material having a predefined thermal expansion coefficient. The features 32, which may be associated with holes of the workpiece 26, may be additively manufactured directly onto the cast portion of the core 30 using another material with a different thermal expansion coefficient. The external shell 42 may be created (by more traditional methods or additively manufactured) using a material with yet a third thermal expansion coefficient. To reduce internal stresses during the mold process, the expansion coefficient of the shell may be substantially different than the expansion coefficient of the cast portion of the core. Furthermore, the expansion coefficient of the features 32 may lie between the expansion coefficients of the shell 42 and the cast portion of the core 30.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A method of manufacturing a mold comprising:
additively manufacturing a shell of a wax mold;
additively manufacturing a core of the wax mold;
assembling the shell of the wax mold and the core of the wax mold;
placing wax material into the wax mold and allowing the wax material to solidify to obtain a wax model;
removing the shell of the wax mold from the wax model;
forming a casting mold by positioning a shell of the casting mold about the wax model, subsequent to the removing the shell of the wax mold from the wax model;
melting or vaporizing the wax material out of the casting mold; and
pouring a material of a workpiece into a cavity of the casting mold and allowing the material of the workpiece to solidify;
wherein the core has a non-line-of-sight feature that is additively manufactured; and
wherein at least the non-line-of-sight feature of the core and the shell of the wax mold are additively manufactured as one unitary piece with the non-line-of-sight feature being connected to the shell of the wax mold.

2. The method according to claim 1, further comprising:
prior to forming the shell of the casting mold, shaping the wax model.

3. The method according to claim 2, wherein the shaping of the wax model includes introducing a refinement upon or into the wax material.

4. The method according to claim 3, wherein the refinement is created through the use of heated tools and wax welding techniques.

5. The method according to claim 3, wherein after the refinement is introduced, the shell of the casting mold is formed over the wax model such that the shell includes a refinement profile of the wax model that is not found on the shell of the wax mold.

6. The method of claim 1, wherein the wax model comprises the wax material and the core of the wax mold.

7. The method of claim 1, wherein the shell of the wax mold is removed from the wax model while maintaining the core of the wax mold in the wax material.

* * * * *